Dec. 17, 1940.　　　P. G. WEIMER　　　2,224,941
EGG VENTING DEVICE
Filed March 23, 1939
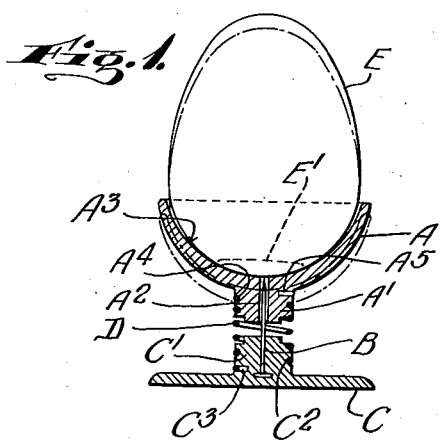
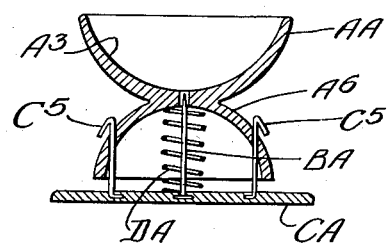
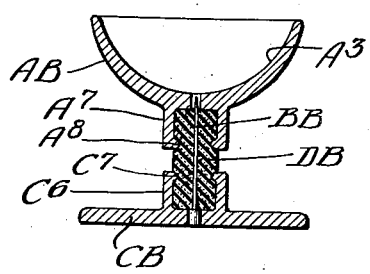
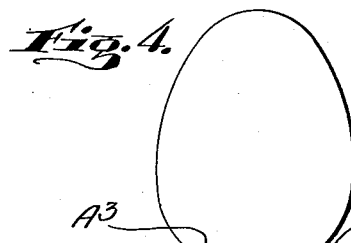
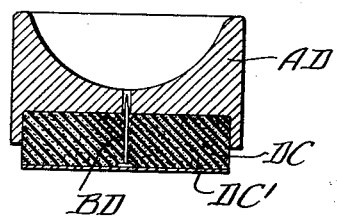
INVENTOR
PHILIP G. WEIMER
BY
John E. Hubbell
ATTORNEY Patented Dec. 17, 1940

2,224,941

UNITED STATES PATENT OFFICE 2,224,941

EGG VENTING DEVICE

Philip G. Weimer, Verona, N. J.

Application March 23, 1939, Serial No. 263,745

5 Claims. (Cl. 146—2)

The general object of the present invention is to provide a simple, effective and relatively inexpensive device for use in forming a small air vent opening in the large end of the shell of an egg, and particularly an ordinary hen's egg, which is to be boiled or cooked in the shell.

As is well known, in boiling eggs, especially eggs which are initially at the relatively low temperatures at which eggs are customarily maintained in domestic refrigerators, it is a common occurrence for the shell of an egg to crack in the boiling operation. This results in the extrusion from the shell, and ordinarily the wastage, of a portion of the albumen of the egg. Furthermore, on the removal of the cooked egg from the cracked shell, it is ordinarily found that the appearance and frequently the physical characteristics of the egg have been impaired as a result of the albumen extrusion.

I have found that such cracking of egg shells in the course of the egg boiling operation may be eliminated by forming a small vent opening at the large end of the egg through the egg shell and the immediately adjacent membrane lining the shell and forming the outer wall of the air space at that end of a normal hen's egg. If the vent opening formed is suitably small no albumen will escape through the opening during the boiling operation, and if the second membrane forming the inner wall of the air pocket is not punctured there will be no significant difference in appearance, or in physical characteristics, between an egg which has been boiled after having its shell punctured in accordance with the present invention, and a similar egg boiled without having its shell first punctured, or cracked in the boiling operation.

A specific object of the present invention is to provide an egg puncturing device of such character that in the puncturing operation, external pressure is applied against a considerable portion at the large end of the egg adjacent the point at which the air vent opening or puncture is formed, as I have found, that such pressure substantially eliminates a risk, otherwise experienced, of breaking the egg shell in the puncturing operation. When one attempts, for example, to form an air vent opening in the end of the shell of an egg held in one hand, by forcing a pin held in the other hand through the shell, there is a substantial risk that the shell of the egg will be broken in the attempt.

In preferred forms of my invention, a puncturing pin is secured to a base part with the puncturing end of the pin in position to extend through a passage formed in an egg engaging part and opening centrally into a cavity or concave egg receiving seat formed in said engaging part. The said seat is shaped to bear against a suitably large annular portion of the external surface of an egg pressed against said seat, so as to compress resilient means resiliently opposing the movement of said seat in the longitudinal direction of the puncturing pin required for the movement of the puncturing end of the latter into the egg. Preferably the pin and egg engaging parts are so proportioned and disposed that in the egg puncturing operation, the pin will not protrude from said part far enough to puncture the membrane forming the inner wall of the air pocket of a normal hen's egg.

In some forms of the invention, the egg engaging and base parts are relatively movable rigid parts, yieldingly held apart by a separate spring part. In other advantageous forms of the invention, either the egg engaging, or the base part, may be a rigid part while the other is in the form of an elastic cushion, which ordinarily will be a body of soft rubber, and which is adapted to be compressed by the pressure of an egg against the egg engaging seat of the device, and moving said seat relative to the puncturing pin to cause the latter to enter the egg. The rigid parts of the device in any of its forms may be formed of any one of a wide number of suitable available materials.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Fig. 1 is a section extending through the axis of an egg puncturing device;

Figs. 2, 3, 4, and 5 are sections, each taken similarly to Fig. 1, and each illustrating a different modification of the device shown in Fig. 1; and Fig. 6 is a partial section illustrating a modification of a portion of the device shown in Fig. 4.

The device shown in Fig. 1, comprises a cup-shaped egg engaging or seating part A, having a central external boss or lug A', with a passage $A^2$ therein, which is coaxial with the cup and in which the egg puncturing end of an egg puncturing pin B is normally received. The pin B has its other end secured to a base or supporting member or part C. The latter, as shown, comprises a disc adapted to rest on a table and a coaxial lug or boss C', extending upward from the disc and in which a lower portion of the pin B is anchored. In the normal condition of the device shown in Fig. 1, the adjacent ends of the lugs A' and C' are held apart by a helical spring D, acting between the parts A and C to oppose their relative approach movement necessary to move the upper egg puncturing end of the pin B above the bottom of the egg receiving cavity or seat $A^3$ of the part A.

When an egg E, seated in said cavity, as shown in Fig. 1, is pressed downwardly so as to move the part A, relative to part C, from its position, shown in full lines, to its position shown in dotted lines, the pin B, which does not share the down movement of the part A, punctures the shell of the egg and its membrane lining, and thus forms an air vent opening from the air pocket E' of the egg.

The spring D may be associated with the parts A and C in various ways. As shown in Fig. 1, the lug A' is formed externally with a thread groove $A^4$ into which the upper end portion of the spring D is threaded, and the lug C' is formed externally with a similar thread groove $C^2$ into which the lower end of the spring D is threaded. To prevent accidental separation of the parts, the spring D may terminate at each end in a portion which extends radially inward toward the axis of the spring, one of said portions being received in a radial opening $A^5$ in the support A, and the other of said portions being received in a radial opening $C^3$ in the base member C.

The parts A and B may well be formed of Bakelite but they may also be formed of any one of many other materials. The device in the form shown in Fig. 1, is relatively inexpensive to manufacture, and is characterized by its mechanical simplicity and compactness, and by the ease with which it may be cleaned.

In the modification shown in Fig. 2, the egg engaging part AA comprises an upper cup shaped egg receiving, body portion, and a lower coaxial bell or skirt part $A^6$, which may be integral with or otherwise connected to said body portion. The part $A^6$ surrounds and encloses the major portion of the length of a coil spring DA coaxial with and acting between the part AA and a base member part CA. Bent wires $C^4$ anchored at their lower ends in the base member CA, extend through vertical openings formed for the purpose in the skirt part $A^6$, and have their upper ends $C^5$ transversely bent, so that said wires may guide the egg support AA in its vertical movements, limit the extent of movement of the part AA away from the part CA, and hold the parts of the device in their normal assembled condition.

The operation of the device shown in Fig. 2 is essentially the same as that of the device shown in Fig. 1. Down pressure on an egg having its lower larger end engaging the seat $A^3$ of the part AA of Fig. 2, will cause the egg shell to be punctured by a pin BA anchored at its lower end in the base member CA, and having its upper end extending into an opening in the bottom wall of the seat $A^3$.

In the form shown in Fig. 3, the egg puncturing device comprises an egg engaging part AB and a base part CB. Those parts are formed with coaxial hollow lugs $A^7$ and $C^6$, respectively, aligned as are the lugs A' and B' of Fig. 1, and having their adjacent ends open to receive the corresponding ends of a spring member DB. The latter, as shown, is a short rubber cylinder, or thick walled tube, in which the upper portion of the puncturing pin BB is axially disposed. As shown, the hollow bosses $A^7$ and $C^6$ are formed with inturned flange portion $A^8$ and $C^7$, respectively, at their adjacent ends, and the rubber spring DB is formed with circumferential grooves receiving said flanges, which thus hold the parts of the device against accidental displacement. Each of the egg engaging and supporting parts AB and CB may be formed of any suitable material, but, as shown, the base part CB is formed of metal or other material adapted to have the puncturing pin anchored in place by a driving fit engagement of the lower portion of the pin with the wall of a central opening formed for the purpose in the base member.

In the form of the invention illustrated in Fig. 4, the egg seat $A^3$ is formed by the upper surface of an elastic compressible cushion AC, which ordinarily is a body of soft rubber, and is shown as mounted in a suitably shaped recess $C^8$ formed in the upper side of a base member CC, formed of hard rubber or other suitable material, and in the lower portion of which the lower portion of the centrally disposed egg puncturing pin BC is imbedded. The parts of the device shown in Fig. 4 are so proportioned that in the uncompressed condition of the cushion member AC, the end of the pin BC will extend approximately to the upper egg seat $A^3$ formed by the upper surface of the body AC. In consequence, when down pressure is applied to an egg engaging the seat $A^3$ the cushion AC will be compressed about the pin BC, which is thereby caused to puncture the egg shell, and as the cushion is thus compressed, it exerts a suitable supporting pressure against an annular portion of the egg shell surrounding the point at which the egg shell is punctured.

While it is in general desirable that the egg engaging or seat surface $A^3$ of the cushion AC be concave, so as to initially conform more or less closely to the surface contour of the larger end of a hen's egg of ordinary size and shape, the shape of the underside of the cushion AC is in general immaterial, except that ordinarily, it should conform to whatever shape is given to the base member cavity $C^8$. As shown, the cushion AC is in the general form of a concavo-convex lens. It may be given that shape in the process of its manufacture, or it may be a flat disc of rubber sprung into its concavo-convex form, in the course of its insertion in the cavity $C^8$, and held in said form by the wall of that cavity. That wall, as shown, is formed at its upper edge, with an internal retaining bead or flange $C^9$ which extends over the marginal portion of the cushion AC. In addition to, or in lieu of, the retaining action on the cushion of the flange $C^9$, the cushion AC may be cemented to the wall of the cavity $C^8$.

In some cases, the elastic cushion AC may be formed as shown in Fig. 6, with a shallow central recess at its upper side in which is cemented, or otherwise secured, a disc AE of rigid material, such as Bakelite, having a central aperture for the passage of the associated puncturing pin. The disc AE thus provides a suitably shaped, rigid seat for the egg, and a positive guide for the upper end of the puncturing pin. Ordinarily, however, no such part AE will be necessary to the successful use of an egg puncturing device including an egg engaging part of the elastic cushion type shown in Fig. 4.

In the modification shown in Fig. 5, the base part DC is a body of soft rubber in which the head and a substantial portion of the length of the puncturing pin BD is embedded. The upper portion of the rubber body DC is received in a recess formed in the underside of a part AD of wood or other rigid material, which is formed at its upper side with an egg engaging seat A³ and with a passage A² opening to said seat for the egg puncturing pin BD. The rubber body DC may have its upper end cemented to the adjacent surface of the part AD, and, as shown, a reinforcing part DC', which may be a disc of paper, cloth or other available material, is pasted to the lower end of the rubber body, and assists in holding the puncturing pin BD in place in the rubber body DC, when the latter is not resting on a table or analogous support. Pressure applied through an egg engaging the seat A³ of the part AD, while the disc DC' is in engagement with a table or other support, will compress the rubber body DC and cause the pin BD to move through the passage A² into the egg.

My improved device in each of the forms shown is adapted for domestic use and also for use in the kitchens or culinary departments of restaurants, hotels, dining cars, etc. As previously indicated, the rigid parts of the egg puncturing device, in any of the forms disclosed, may each be formed of any suitable and available material, such, for example, as Bakelite, hard rubber, aluminum or other metal, wood, and indurated fibre.

All forms of the egg puncturing device illustrated and described in detail herein, are alike in that they are simple in construction, and are adapted to be constructed of suitable and suitably durable materials at a relatively low cost of manufacture and so as to be readily cleaned, and in that they are reliable in operation, and are well adapted for their intended purpose.

While for most uses, and particularly for domestic use, the base part of the device may rest loosely on a table or shelf during the egg puncturing operation, the device may be operated while held in the hands of the operator, and in some cases, particularly for restaurant or other non-domestic uses, the base part of the device may well be attached to a table, shelf, vertical wall or other support, so as to be always conveniently available for use. To permit the device shown in Fig. 1 to be so attached to a supporting part, its base part C is formed with holes C' for attaching screws.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A device for forming a vent opening in the shell of an egg, comprising an egg puncturing pin, a base part supporting said pin and adapted to rest upon a table-like support, a second part formed with an egg engaging seat, transverse to and facing away from said pin and formed with a passage through which said pin is adapted to pass, resilient material yieldingly opposing movement of said seat relative to said pin in the direction to cause the pin to protrude through said passage into an egg bearing against said seat, whereby said movement may be effected by pressing an egg against said seat while said base is resting on said support.

2. A device for forming a vent opening in the shell of an egg, comprising an egg puncturing pin, a base part supporting said pin and adapted to rest upon a table-like support, and a part formed with an egg engaging seat transverse to and facing away from said pin and formed with a passage through which said pin is adapted to pass and resilient means acting between said parts and yieldingly opposing movement of said seat relative to said pin in the direction to cause the pin to protrude through said passage into an egg bearing against said seat, whereby said movement may be effected by pressing an egg against said seat while said base is resting on said support.

3. A device for forming a vent opening in the shell of an egg, a rigid base formed with a recess in its upper side, and adapted to rest upon a table-like support, an egg puncturing pin secured to said base and having an upper puncturing end portion in said recess and a resilient cushion body mounted in said recess and formed with a passage receiving said pin portion and the upper side of which forms an egg engaging seat transverse to and facing away from said pin and adapted to yieldingly oppose movement of said seat relative to said pin in the direction to cause the pin to protrude through said seat into an egg bearing against said seat, whereby said movement may be effected by pressing an egg against said seat while said base is resting on said support.

4. A device as specified in claim 1, in which one of said parts comprises a skirt portion surrounding said resilient material.

5. A device as specified in claim 1, in which each of said parts comprises an axial portion adjacent to and facing the axial portion of the other, and in which the resilient material forms a vertically disposed spring having its lower and upper ends attached to the said axial portions of said base and second parts, respectively, to thereby mechanically connect said parts.

PHILIP G. WEIMER.